Patented Sept. 4, 1928.

1,683,466

UNITED STATES PATENT OFFICE.

JOSEPH A. HORIGAN, OF KANSAS CITY, MISSOURI.

CAPSULE.

No Drawing.  Application filed May 9, 1927.  Serial No. 190,138.

The invention relates to intestinal administration of insulin and other drugs, medicines, remedies and the like.

The object of the present invention is to enable insulin and other drugs, medicines, remedies and the like to be taken internally and be caused to pass through the stomach in a capsule or other analogous container in a preserved or undissolved condition and to enter the intestines and be dissolved by the alkaline juices thereof whereby the insulin or other substances will be preserved and protected from the action of the juices of the stomach and duodenum and liberated by the dissolving of the capsule or container in the jejunum or other portion of the intestines to be acted on by the juices of the intestines and carried by the same in the intestinal digestive operations whereby insulin and other drugs, medicines, remedies and the like enter the blood in the usual natural manner and a maximum efficiency thereby obtained.

A further object of the invention is to enable the solubility of a capsule or other analogous container to be varied so that the capsule or container will be preserved until it reaches the desired point in the intestines and cause the same to be dissolved by the intestinal juices at such point in the intestines.

Another object of the invention is to provide a capsule or container for the intestinal administration of insulin and other drugs, medicines, remedies and the like which will not only be insoluble in the acid fluids of the stomach but which will resist the body heat and be soluble only in the alkaline juices of the intestines.

The invention consists in painting or otherwise coating the interior and exterior of a capsule with a benzoin preparation or incorporating benzoin into the walls of the capsule, the amount of benzoin held or contained in or on the walls of the capsule determining the degree of solubility of the capsule in the intestinal juices. Capsules so treated may be doubled, tripled, quadrupled, etc., and placed one within another and increasing in size outwardly, the inner or smaller capsule containing the insulin, drugs, medicines, remedies and the like. By capsule it will be understood that all forms of analogous containers such as shells, cells and the like are included. Various benzoin preparations have been found to be effective as benzoin will render the capsule or container insoluble in the acid fluids of the stomach.

What I consider to be the best benzoin preparation is made by dissolving benzoin in alcohol making ordinary tincture of benzoin. An empty capsule is painted on the inside and outside with tincture of benzoin and afterwards insulin or other drugs, medicines, remedies or the like is placed in the capsule which can be made to dissolve in the intestines after leaving the stomach. If painted a second coat of tincture of benzoin, the capsule will dissolve further along and the benzoin preparation may be applied sufficiently thick to cause the capsule to pass undissolved entirely through the body. By varying the amount of the benzoin contained in or held on the walls of the capsule the degree of solubility of the capsule under the action of the intestinal juices may be varied and the capsule caused to progress to the desired point and there be dissolved. The progress of the capsule in and through the intestines has been observed by means of the X ray. Benzoin resists the heat of the deep tissues of the body and is insoluble in acids especially weak acids, and is freely soluble in alkaline solutions. With the use of benzoin the body temperature may be disregarded, the solubility of the capsule depending entirely on the alkalinity of the intestinal juices plus whatever chemical action takes place between the benzoin and the chyme. As benzoin contains much benzoic acid the benzoic acid could be used with resins and other substances as any preparation containing benzoin in any form will preserve a capsule or analogous container while passing through the stomach and will permit the capsule container to be dissolved by the action of the juices of the intestines. Benzoinated table butter, mutton tallow, beef suet, bees wax, stearin, stearic acid and balsamic resins and the like may be used and will protect the active principle administered and prevent chemical change thereof before the same reaches the lymph and blood and will aid in its absorption by the lacteals and lymph vessels of the intestines. While this method of intestinal administration of drugs, medicines, remedies, etc. is especially advantageous in administering insulin, of course, any other remedy may be administered intestinally and various substances whether in solid, liquid or gaseous form may be caused to pass through the stomach unaffected by the juices thereof and pass into the intestines and dissolved by the intestinal juices.

What is claimed is:

1. Means for intestinal administration of medicines and the like, comprising a plurality of capsules or containers arranged one within another, each capsule or container holding in its walls a benzoin preparation, the capsules or containers increasing in size outwardly and the innermost capsule or container being adapted to receive the medicine or the like to be administered.

2. A capsule or container holding in its walls a benzoin preparation and adapted for use in intestinal administration of medicines or the like.

3. A capsule or container having its inside and outside coated with a benzoin preparation and adapted for intestinal administration of medicines and the like.

4. A capsule or container having a wall coated with a benzoin preparation, said capsule or container being adapted for use in intestinal administration of medicines and the like.

5. A capsule or container carrying a preparation containing benzoin to preserve the capsule or container while passing through the stomach and in such quantity as to control the distance of passage of the container or capsule through the intestines before being dissolved, said capsule or container being adapted for the intestinal administration of medicines and the like.

In testimony whereof I have hereunto set my hand.

JOSEPH A. HORIGAN.